United States Patent [19]

Berger et al.

[11] Patent Number: 4,573,954
[45] Date of Patent: Mar. 4, 1986

[54] DIGITAL ENCODING AND ELECTRONIC SCANNING OF DRINK CUPS

[75] Inventors: Martin J. Berger, Dobbs Ferry, N.Y.; Sheldon P. Apsell, Newton, Mass.

[73] Assignee: PepsiCo Inc., Purchase, N.Y.

[21] Appl. No.: 647,035

[22] Filed: Sep. 4, 1984

[51] Int. Cl.[4] ............................................. B31B 1/88
[52] U.S. Cl. ................................. 493/55; 235/383; 235/464; 273/138 A; 273/138 R; 273/139; 400/103; 493/53
[58] Field of Search ................... 273/149 R, 296, 306, 273/138 A, 138 R, 139; 40/324; 400/103, 104, 105, 106, 107; 493/53, 54, 55; 235/283, 383, 464

[56] References Cited

U.S. PATENT DOCUMENTS

| | | | |
|---|---|---|---|
| 3,223,421 | 4/1963 | Herschkowitz | 273/139 |
| 3,438,628 | 4/1966 | Becker et al. | 273/139 |
| 3,466,775 | 9/1969 | Smith | 273/139 |
| 3,734,509 | 5/1973 | Glass et al. | 273/139 |
| 3,900,219 | 8/1975 | D'Amato et al. | 273/139 |
| 3,917,276 | 11/1975 | Greenbarg | 273/139 |
| 3,919,032 | 11/1975 | Greenbarg | 273/139 |
| 3,940,124 | 2/1976 | Johnsen | 270/61 |
| 3,956,049 | 5/1976 | Johnsen | 273/139 |
| 4,191,376 | 3/1980 | Goldman et al. | 273/139 |
| 4,287,824 | 9/1981 | Bogle | 101/45 |
| 4,373,726 | 2/1983 | Churchill et al. | 273/139 |
| 4,518,639 | 5/1985 | Phillips | 273/139 |

Primary Examiner—Francis S. Husar
Assistant Examiner—Robert Showalter
Attorney, Agent, or Firm—Scully, Scott, Murphy & Presser

[57] ABSTRACT

An arrangement for conducting an on-the-cup promotion in which promotional prize information is encoded onto each soft drink cup with an optically machine-readable code. The code is used with the promotion to identify whether a customer has won any of the different prizes available. In order to provide the needed variation and the completely random distribution of prizes needed for a fair game, each individual cup is separately encoded as it is being manufactured by a computer controlled printing station directly preceding a cup-forming machine. All of the necessary information on the number or prizes, the frequency of occurrence of each prize, and a program to randomize that frequency is placed in the computer software. A scanner at the point of sale scans the code, signals whether the cup is a prize winner or not, and delivers a printed ticket notifying winners of their prizes and how to redeem them.

13 Claims, 5 Drawing Figures

SCANNER CODE IMPRINTING PROCESS

DIGITAL ENCODING AND ELECTRONIC SCANNING OF DRINK CUPS

BACKGROUND OF THE INVENTION

1. Field of the Invention

The present invention relates generally to an improved arrangement for conducting on-the-cup promotions, and more particularly pertains to a computer automated and controlled method and apparatus for conducting an on-the-cup promotion by placing a machine-readable code on each cup, with the code being subsequently scanned and interpreted at the point of sale to determine if it is a promotion winner.

2. Discussion of the Prior Art

Known prior art on-the-cup (OTC) promotions typically employ expensive three-view labels that are separately manufactured and affixed to the cups during the cup fabrication process. A person who buys a soft drink removes the label after the drink is consumed, and a game message or prize message is revealed. All current OTC promotions employ some variation of this same basic approach. Because these three-view labels are quite expensive to manufacture and add to each cup, substantial economies could be realized by eliminating this type of labelling. Other drawbacks and limitations are also associated with the labelling process, such as a potential reduction in the speed of cup production, and logistical and security problems raised by the necessity of placing grand prize winners by hand into individual cup packages.

The patent literature also discloses gaming systems, typically involving lottery systems, which employ individual features similar to those of the present invention, such as a computer controlled printer in a lottery system, digital codes on lottery tickets, and code readers therefor.

For instance, Johnsen U.S. Pat. No. 3,940,124 discloses a manufacturing process in which a multi-ply lottery ticket is formed from an endless web of sheet material. The web of sheet material is transversely subdivided into a series of interconnected blanks, each of which is transversely trisected into a set of three continuous panels to define a multi-ply ticket wherein the contiguous panels are accordion-folded to form the various plies thereof. Johnsen is of particular interest because a computer controlled printing station applies coded indicia to several of the panels of the multi-ply lottery ticket.

Goldman, et al. U.S. Pat. No. 4,191,376 discloses a similar system in which a lottery ticket is printed with a visible printed numerical serial number and a concealed lottery number. A digital computer determines the lottery number which is to appear on a given lottery ticket. The digital computer includes a serial number generator which generates the serial number for each of a sequence of tickets in accordance with a recordkeeping plan which identifies the game, lot and ticket. The serial numbers are transformed by an algorithmic converter into intermediate numbers which are in consecutive order for all tickets. A second algorithmic converter then operates on the intermediate number, and generates the lottery number. Thus, a million consecutive (or partially consecutive) serial numbers can be converted into a million seemingly random, nonconsecutive, non-duplicative lottery numbers.

Churchill, et al. U.S. Pat. No. 4,373,726 also discloses a computer controlled gaming or lottery system in which a gaming card, dispensing unit reads a code representation from a gaming card which indicates a gaming indicia format. The coded representation read from the card is verified, and a control identification is assigned to that card and stored with the coded representation in memory. Selected gaming indicia such as the control identification of a winning card are also entered into the computer memory. The control identification of the winning card is first validated, and then the gaming indicia which have been selected are compared with the gaming indicia format of the winning card to determine if a predetermined pattern of the selected indicia is present on the card format, indicating a winning card.

Although the prior art discussed hereinabove concerns computerized operations involving lottery tickets, it does not address the particular problems associated with on-the-cup promotions, particularly the problems associated with printing coded indicia on particular cups without encumbering or slowing down present cup printing and cup forming operations.

SUMMARY OF THE INVENTION

Accordingly, it is a primary object of the present invention to provide a novel method and arrangement for conducting on-the-cup promotions which eliminate the use of expensive, three-view labels which must be mechanically affixed to the cups.

A further object of the subject invention is the provision of an on-the-cup promotion which eliminates mechanically affixed labels, and instead advantageously utilizes a machine-printed and machine-readable code having the potential of reducing costs, adding security, simplifying prize distribution logistics, and adding novelty and consumer attraction to on-the-cup games and promotions.

In accordance with the teachings herein, the present invention provides an arrangement for conducting an on-the-cup promotion, such as is suitable for a fast food chain promotional operation, by placing a machine-readable code on each cup, with the code indicating a promotion winner or not. Decorative indicia is initially printed on the cup blank stock in a decorative printing operation. A machine-readable code containing promotional prize information is also printed on each individual cup blank, in an automated controlled printing operation separate from the decorative printing operation, prior to subsequent formation of the blank into a cup in a cup forming machine. At the point of sale, the customer, after consumption of the contents of the cup, places the empty cup into a cup scanner and promotion display. The machine-readable code on the cup is then scanned and interpreted to determine if the cup is a prize winner, which is then indicated to the customer by a suitable display.

In greater detail, one particularly advantageous feature of the present invention is that the machine-readable code is printed immediately prior to, and as the cup blank is continuously moving as an input into, the cup forming machine. The is a significant feature of the subject invention as it is important for the on-the-cup promotional printing to be carried out without slowing down existing cup printing and cup forming operations. Decorative printing of the cup blank stock is typically carried out while the stock is moving at a very fast rate (e.g. five or more times the speed at which the stock is moving when it enters a cup forming machine), and in general it is not practical to integrate the printing of the machine-readable code with the decorative printing operation. The cup blank stock is typically moving at a much slower rate (e.g. 150 feet per minute or less) when it enters the cup forming machine, and that rate of movement is compatible with the speed of ink jet printers, such that the printing of the machine-readable code on the stock is advantageously accomplished just ahead of the cup forming machine while the stock is continuously being transported as an input thereto. Moreover, the decorative printing operation can advantageously print positioning marks on the stock, which are detected to properly position the machine-readable codes relative to the decorative print. An ink jet printer also operates advantageously without any direct physical mechanical contact with the blank stock, but a contact type of printer could also be utilized in alternative embodiments hereof.

Pursuant to the teachings of the present invention, promotional prize information is encoded onto each cup in the form of a machine-readable optical code. A common example of an optical code is the Uniform Price Code (UPC) which appears on virtually all mass marketed consumer items. The code employed by the present invention can be much simpler than the UPC code, and many variations can be used within each promotion to identify the different prizes available. The machine-readable code used with the present invention can be much larger than a UPC code, and can be, for example, a series of large, different width character bars in which the spacing from the beginning of one character bar to the beginning of the next character bar is constant, with wider width bars representing a logical one and narrower width bars representing a logical zero. The larger code characters allow a less precise, and accordingly less expensive, character printer and character scanner to be utilized in the implementation of the present invention.

Logistical and security considerations of on-the-cup promotions are important factors in the implementation of the present invention. An alpha-numerical, customer-readable code is also printed on each cup blank, along with the machine-readable code, during the same ink jet printing operation. An optical scanner at the place of purchase reads and interprets the information which has been optically encoded onto each cup. The optical scanner scans the code, signals whether or not the cup is a prize winner, and in the event of a prize winner delivers a printed ticket. The printed ticket identifies the prize, can contain a promotional message, has a printed validation number, and notifies the winner of the prize how to redeem the cup and its associated prize. The printed validation number matches the number encoded on the cup, and thus clearly links the winning cup and the winning ticket. A requirement of the game that both the cup and the ticket must be presented to redeem a prize, guarantees that neither the cup nor the ticket can be redeemed more than once, and ensures the security of the system.

The automated printing operation is controlled by a computer programmed with all necessary promotional details, such that all of the necessary information on the number of prizes, the frequency of occurrence of each prize, and a program to randomize that frequency is placed in software and stored on a magnetic disk or other form of temporary or permanent memory storage. Where cup fabrication takes place on multiple machines, the computers and software can be connected and coordinated to guarantee that no duplication or non-randomness occurs. Accordingly, the prizes, even a single grand prize, can be produced without the knowledge or direct participation of any plant operating personnel. The computer stores in memory all necessary prize information on winning codes and prizes. Similarly, at the scanner and display at the point of sale, all instructions for identifying winning cups and printing prize winning tickets are placed in a software or in a program stored in a replaceable memory device such as a chip. The electronic storage effectively seals all prize information from view, thereby enhancing the security of the promotional game.

The computer can be programmed in many different ways, some of which are exemplified by the prior art discussed hereinabove, to provide the required variation and the completely random distribution of prizes necessary for a fair promotion. The computer is programmed to allow each individual cup to be separately encoded as it is being manufactured. The losing cups are preferably printed with different machine-readable codes and alpha-numerical codes, or alternatively could be coded the same or similarly. However, different code sequences, particularly for the alpha-numerical codes, are preferred to prevent people from attempting to sort through cups to locate a winner.

The print heads and computers are capable of operation at speeds greater than those of the cup fabrication machines, and thus the process does not require any alteration of the speeds at which the cup forming machines are operated. Except for this one added printing step, the entire cup manufacturing and forming process remains unchanged, and therefore cup costs would not be adversely affected.

BRIEF DESCRIPTION OF THE DRAWINGS

The foregoing objects and advantages of the present invention for a system for digitally encoding and electronically scanning drink cups may be more readily understood by one skilled in the art with reference being had to the following detailed description of a preferred embodiment thereof, taken in conjunction with the accompanying drawings wherein like elements are designated by identical reference numberal throughout the several views, and in which.

DETAILED DESCRIPTION OF THE DRAWINGS

Figure 1:
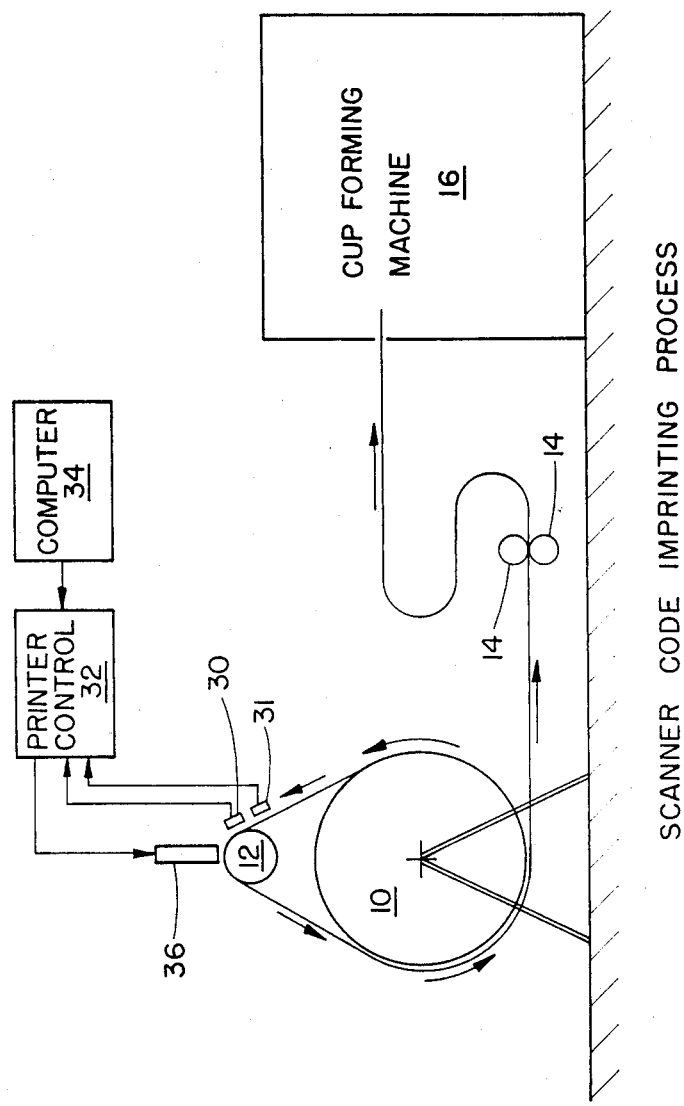
FIG. 1 is a schematic illustration of one exemplary embodiment of a computer controlled code printing arrangement constructed pursuant to the teachings of the present invention.

Referring to the drawings in detail, FIG. 1 is a schematic illustration of one exemplary embodiment of a computer controlled code printing arrangement constructed pursuant to the present invention. Cup blank paper stock has already been printed with decorative printing thereon and waxed, in operations similar to those of the prior art, and is stored on a large roll 10. The cup paper stock passes by a computer controlled code printing station as it passes over a roller 12. The paper stock then continues past and under the roller 12, and through a set of powered rollers 14 which maintain tension on the paper web. The paper web is then fed into the cup forming machinery 16 which is not modified in any way. The entire code printing process takes place at a rate that will not slow down the existing cup forming process and machines.

Figure 2:
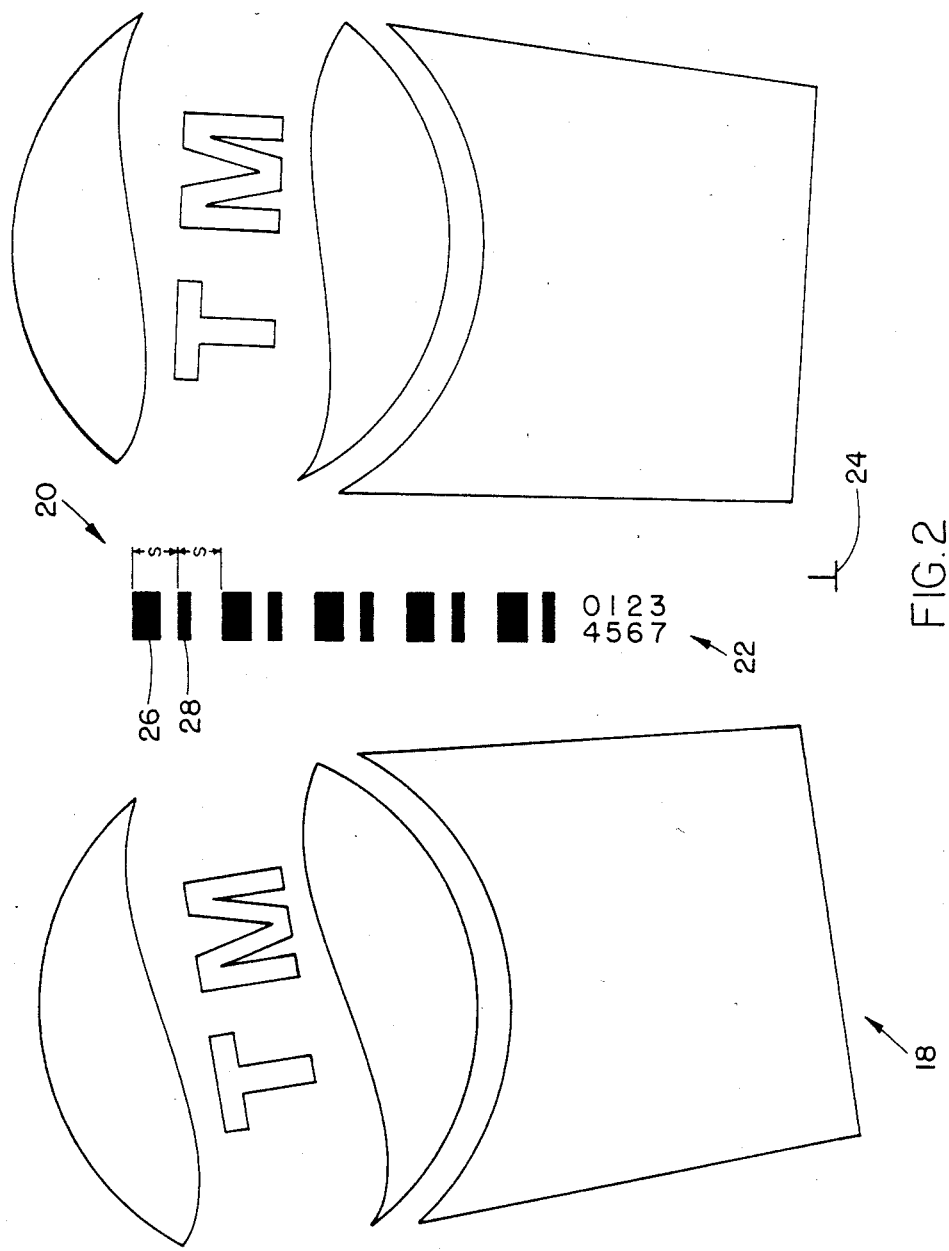
FIG. 2 illustrates an exemplary cup blank having decorative printing and both machine-readable and alpha-numerical codes printed thereon.

Referring to FIG. 2, one exemplary cup blank 18 is illustrated, and includes similar decorative printing on opposite sides of a suitable machine-readable code 20, which is positioned above an alpha-numerical code 22. The decorative printing also has placed a positioning mark 24 on the blank to assist in proper placement of the codes 20 and 22 relative to the decorative printing. The code 20 is illustrated as a series of large, different width character bars in which the spacing S from the beginning of one character bar to the beginning of the next character bar is constant, with wider width bars 26 representing a logical one and narrower width bars 28 representing a logical zero. The relatively large code characters allow a less precise, and accordingly less expensive, character printer and character scanner to be utilized in the implementation of the present invention. Of course, different types and placements of both codes 20 and 22 are possible, and may be preferred, in other embodiments. Moreover, in some embodiments the character printer might advantageously print other types of codes, such as a date code, on the cup.

Referring back to FIG. 1, the code printing station include a photodetector 30, positioned relative to the paper web to detect the printing mark 24, which is detected and utilized to properly position the codes 20 and 22 relative to the decorative print, and a speed encoder 31 is also provided to control the printing rate and to correct for any variations in the speed of movement of the paper stock. Encoders are commercially available and well known in the art. For instance, Wingate U.S. Pat. No. 3,187,187, issued June 1, 1965, discloses and discusses an angular encoder suitable for use with the present invention. Also, Dresser Industries manufactures and supplies commercially incremental shaft angular encoders suitable for use with the present invention. The detection pulse from detector 30 is directed to a printer control unit 32 as a timing mark. The printer control unit 32 receives instructions from computer 34 on which variation of the codes 20 and 22 are to be printed on each individual cup. A dot matrix ink printer 36 is one type of preferred printer as it is capable of operation at a speed greater than that of the paper web as it feeds into the cup fabrication machine 16, and because ink jet printers operated in a completely nonmechanical fashion (no direct physical mechanical contact with the cup), such that the process does not require any alteration of the speed at which the cup forming machines is operated.

The automated printing operation is controlled by computer 34 programmed with all necessary promotional details, such that all of the necessary information on, the number of prizes, the frequency of occurrence of each prize, and a program to randomize that frequency, is placed in software or Read Only Memory (ROM). In a preferred embodiment, the computer is programmed to allow each cup to be separately encoded in a manner to provide the required variation and the completely random distribution of prizes necessary for a fair promotion.

The present invention provides an arrangement for conducting an on-the-cup promotion, such as is suitable for a fast food chain promotional operation, by placing a machine-readable code 22 on each cup. At the point of sale, the customer places the cup into a cup scanner and promotional display. The machine-readable code on the cup is then scanned and interpreted to determine if the cup is a prize winner, which is then indicated to the customer by a display and by delivery of a printed validation ticket which identifies the prize, has a printed validation number thereon, and informs the winner how to collect the prize. In a preferred embodiment, the printed validation number matches the number encoded on the cup, and thus clearly links the winning cup and the winning ticket. A preferred requirement of the promotion is that both the cup and the ticket must be presented to redeem the the prize, thus guaranteeing that neither the cup nor the ticket can be redeemed more than once, and ensuring the security of the system.

Figure 3:
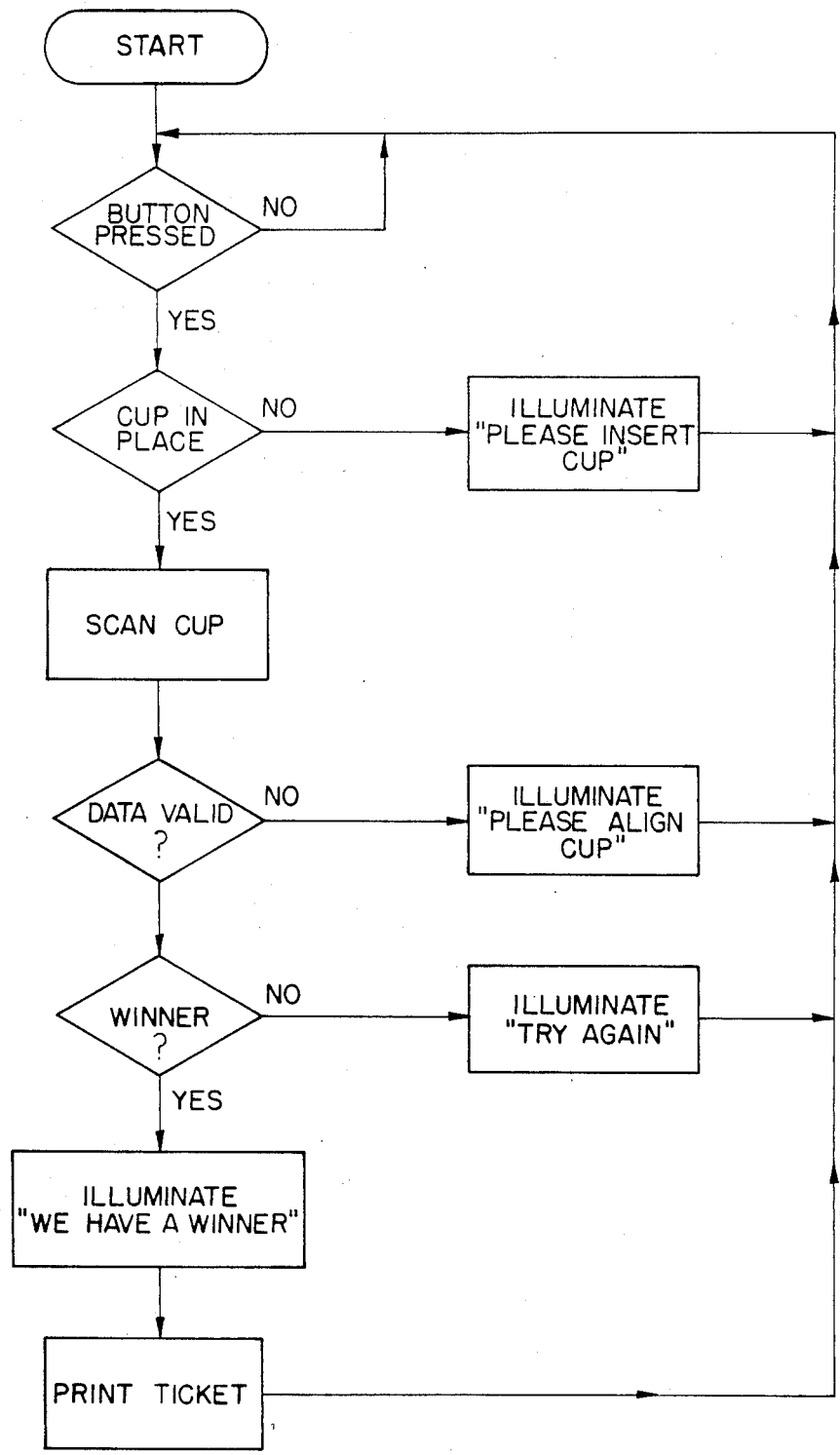
FIG. 3 illustrates an exemplary logic flow diagram for a computer controlled code scanner, operative at the point of sale.

FIG. 3 illustrates an exemplary logic flow diagram for a computer controlled code scanner, operative at the point of sale. After an empty cup is placed in a scanner, a start button is pressed. If a cup is detected to be in the scanner, the cup is then scanned to detect the code. If no cup is present, a "PLEASE INSERT CUP" notice is illuminated. The cup is then scanned, and the data is checked for a valid winning or nonwinning code. If valid code data is not detected, a "PLEASE ALIGN CUP" notice is illuminated to properly align code 20 in the scanner. If the data is valid, but the detected code is not a winner, a notice such as "TRY AGAIN" is illuminated to notify the person of his losing. If the detected code is a winner, an appropriate notice such as "WE HAVE A WINNER" is illuminated, and a validation ticket is printed.

Figure 4:
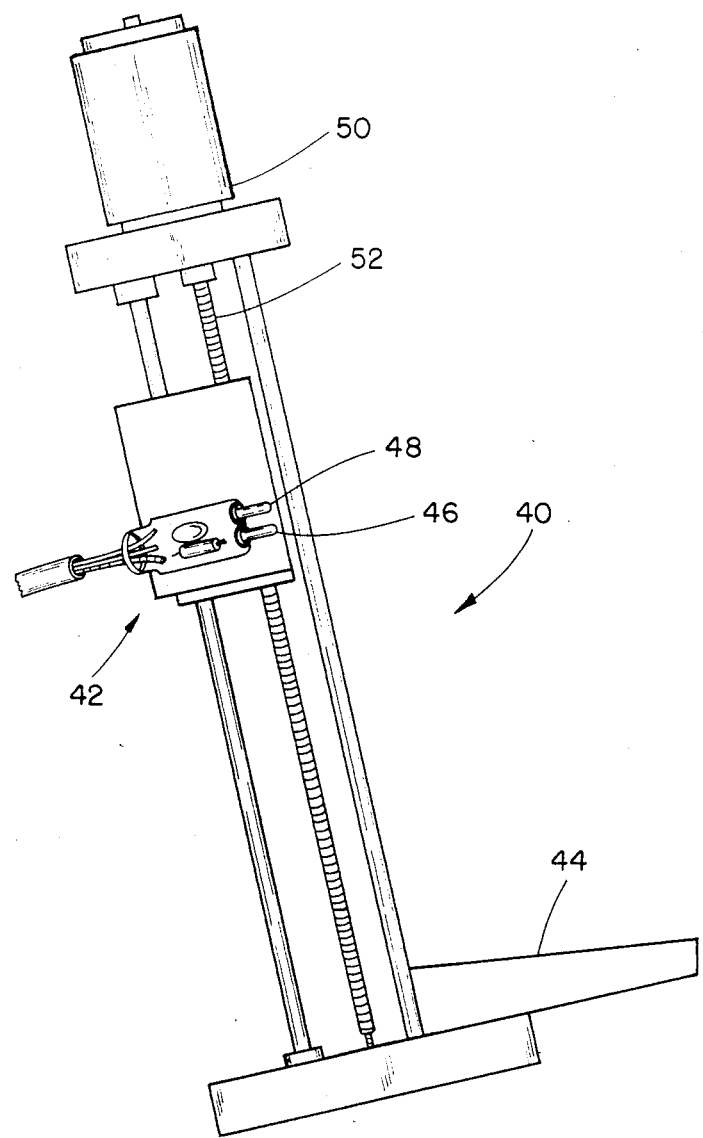
FIG. 4 is an exemplary embodiment of a mechanically driven scanner assembly, illustrated in block form in FIG. 5.

FIG. 4 is an exemplary embodiment of a mechanically driven scanner assembly 40 in which a scanning head 42 is driven along a substantially vertically printed code 20, as shown in FIG. 2, on a cup positioned on an inclined base 44. The scanning head 42 includes a code illuminating light 46 and a photodetector 48 which detects the relative amounts of light and dark areas in the code 20. The scanning head 42 is driven along the code by a simple motor 50 and worm screw drive 52, which might include limit switches to reverse or shut off the motor 50. The use of a large bar code as illustrated in FIG. 2 allows a relatively simple and inexpensive scanning arrangement to be utilized, such as illustrated in FIG. 4. Obviously other types of mechanical or optical scanners could be utilized in alternative embodiments.

Figure 5:
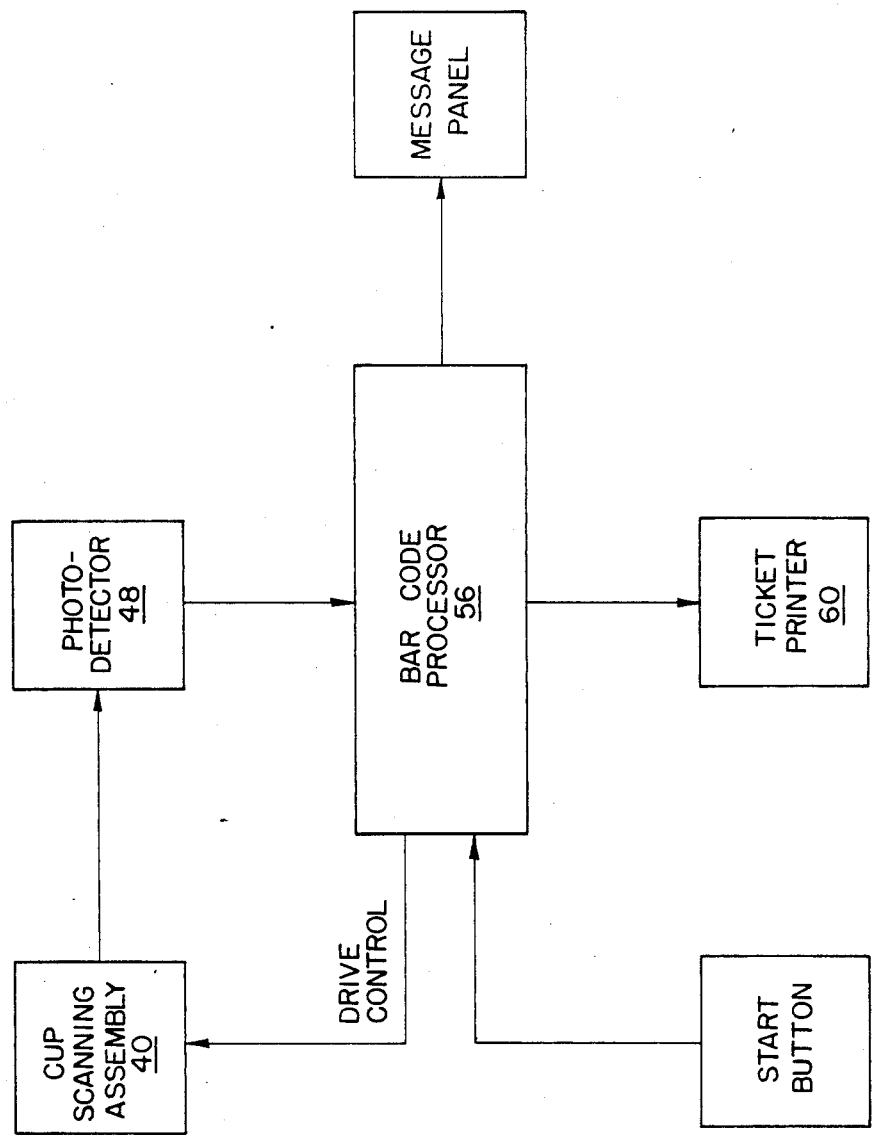
FIG. 5 illustrates a block diagram of a computer controlled code scanner and promotional display, operative at the point of sale.

FIG. 5 illustrates a block diagram of a computer controlled code scanner and promotional display, operative at the point of sale. Upon actuation of a start button in the logic sequence of FIG. 3, the scanner 40 is actuated, and the coded output of photodetector 48 is checked for valid data and for a winning or losing code by a code processor 56. The processor 56 at the scanner and display contains therein in memory all necessary prize information on winning codes and prizes, and all instructions for identifying winning cups and printing prize winning tickets, which are placed in software or in a program stored in a memory chip, such as a ROM, in processor 56. A message panel 58 is provided for the appropriate displays shown in FIG. 3, along with a validation ticket printer 60, which operates as described hereinabove. In one alternative embodiment, the processor 56 might also be provided with an output port for connection to a voice synthesizer for enunciating promotional instructions or other types of aural or visual special effects could be provided, such as flashing lights or bells.

While one embodiment and several variations of the present invention for a system for digitally encoding and electronically scanning drink cups are described in detail herein, it should be apparent that the disclosure and teachings of the present invention will suggest many alternative designs to those skilled in the art.

What is claimed is:

1. A method of conducting an on-the-cup promotion by placing a machine-readable code on each cup, with the code indicating a promotion winner or not, comprising:
   a. printing decorative indicia on cup blank stock prior to formation of individual cup blanks into cups in a cup forming machine;
   b. printing a machine-readable code containing promotional prize information on each individual cup blank, in an automated controlled printing operation separate from said decorative printing operation, prior to formation of the blank into a cup in a cup forming machine;
   c. forming the blanks into cups with a cup forming machine, subsequent to the machine-readable code printing operation;
   d. scanning the machine-readable code on the cup at the point of sale of the cup to determine if the cup is a prize winner; and
   e. indicating by a display at the point of sale whether or not the customer's cup is a prize winner.

2. A method of conducting an on-the-cup promotion by placing a machine-readable code on each cup as claimed in claim 1, said step of printing a machine-readable code being conducted immediately prior to and while the cup blank is continuously moving as an input into the cup forming machine.

3. A method of conducting an on-the-cup promotion by placing a machine-readable code of each cup as claimed in claim 1, further comprising printing an alpha-numerical, customer-readable code legend on each cup blank along with the machine-readable code during the same printing operation.

4. A method of conducting an on-the-cup promotion by placing a machine-readable code of each cup as claimed in claim 1, wherein said step of printing a machine-readable code comprises printing with an ink jet printing operation not involving mechanical physical contact with the cup blanks.

5. A method of conducting an on-the-cup promotion by placing a machine-readable code of each cup as claimed in claim 1, wherein said automated controlled printing operation is controlled by a computer programmed with the promotional prize information comprising information on winning codes.

6. A method of conducting an on-the-cup promotion by placing a machine-readable code of each cup as claimed in claim 1, wherein said step of indicating a prize winner includes the step of printing a winning ticket, and the winning customer redeeming both the winning ticket and the winning cup to claim the prize.

7. A method of conducting an on-the-cup promotion by placing a machine-readable code of each cup as claimed in claim 6, wherein the step of printing a winning ticket includes printing on the ticket a validation code matching a code on the winning cup.

8. A method of conducting an on-the-cup promotion by placing a machine-readable code of each cup as claimed in claim 1, said step of printing a machine-readable code including aligning the machine-readable code with printed decorative indicia by optically detecting an alignment marker placed on the cup blank during the decorative printing thereof.

9. A method of conducting an on-the-cup promotion by placing a machine-readable code of each cup as claimed in claim 1, said step of printing a machine-readable code comprising printing a relatively large optical bar code on each cup blank between printed decorative indicia, and said step of scanning the machine-readable code comprises placing each cup in a cup stand having an optical scanner therein.

10. Apparatus for conducting an on-the-cup promotion by placing a machine-readable code on each cup, with the code indicating a promotion winner or not, comprising:
    a. a printer for printing a machine-readable code, containing promotional prize information, on each cup blank, which already has decorative indicia thereon, said printer having an optical detector for detecting an alignment marking placed thereon to properly position the machine-readable code relative to the decorative indicia, said printer being positioned adjacent to a cup forming machine for forming the individual cup blanks into cups, with the cup blank stock traveling at a relatively constant speed through said printer into said cup-forming machine; and
    b. a computer, programmed with promotional prize information on winning codes, controlling said printer to print individually different codes on different cup blanks.

11. Apparatus for conducting an on-the-cup promotion by placing a machine-readable code on each cup, as claimed in claim 10, further including a speed encoder for monitoring the speed of the cup blank stock to control the printing rate in accordance with the speed of movement of the cup blank stock.

12. Apparatus for conducting an on-the-cup promotion by placing a machine-readable code on each cup, as claimed in claim 10, said computer being programmed to control said printer to print an alpha-numerical, customer-readable code legend on each code blank along with the machine-readable code during the same printing operation.

13. Apparatus for conducting an on-the-cup promotion by placing a machine-readable code on each cup, as claimed in claim 12, said printer comprising an ink jet printer, thereby avoiding mechanical physical contact with the cup blanks.

* * * * *